United States Patent [19]

Weber

[11] Patent Number: 4,722,544
[45] Date of Patent: Feb. 2, 1988

[54] MOUNTING ASSEMBLY FOR UNSTEERABLE WHEELS

[75] Inventor: Georg Weber, Vienna, Austria

[73] Assignee: Steyr-Daimler-Puch AG, Vienna, Austria

[21] Appl. No.: 927,009

[22] Filed: Nov. 4, 1986

[30] Foreign Application Priority Data

Nov. 6, 1985 [AT] Austria .................. 3194/85

[51] Int. Cl.$^4$ .............................................. B60G 3/18
[52] U.S. Cl. ............................. 280/688; 280/660; 280/675; 280/716
[58] Field of Search ............... 280/688, 715, 716, 724, 280/660, 675

[56] References Cited

U.S. PATENT DOCUMENTS

| 4,157,840 | 6/1979 | Kroniger et al. | 280/688 |
| 4,326,734 | 4/1982 | Kroniger | 280/688 |
| 4,410,201 | 10/1983 | Iijima et al. | 280/688 |
| 4,565,389 | 1/1986 | Kami et al. | 280/688 |

FOREIGN PATENT DOCUMENTS 1911795 9/1970 Fed. Rep. of Germany .
2029346 12/1971 Fed. Rep. of Germany .
2319943 11/1974 Fed. Rep. of Germany .
2818198 10/1979 Fed. Rep. of Germany .
3243434 5/1984 Fed. Rep. of Germany .

OTHER PUBLICATIONS

Jornsen Reimpell, Fahrwerktechnik (1970), pp. 402–403.

Primary Examiner—Richard A. Bertsch
Attorney, Agent, or Firm—Marmorek, Guttman & Rubenstein

[57] ABSTRACT

An axle and suspension assembly for mounting two unsteerable wheels of a motor vehicle comprises a crosspiece secured by means of elastic mounting bodies to a rigid structure of the vehicle. The mounting bodies have different stiffnesses in different directions in a generally horizontal plane. Two wheel carriers are linked to the crosspiece by means of two lower transverse control arms arranged at acute angles to each other, and, in addition, each wheel carrier is connected to the rigid structure by a longitudinal control arm. The crosspiece is also connected to the rigid structure of the vehicle by two diagonal struts.

14 Claims, 2 Drawing Figures

MOUNTING ASSEMBLY FOR UNSTEERABLE WHEELS

BACKGROUND OF THE INVENTION

1. Field of the Invention

This invention relates to an axle and suspension assembly for mounting two unsteerable wheels of a motor vehicle, wherein a crosspiece is provided with elastic mounting bodies, which are adapted to be secured to a body or another rigid structure of the motor vehicle, and two wheel carriers, which are linked to said crosspiece and constrained to move in a generally vertical direction, each of said mounting bodies has different stiffnesses in different directions in a generally horizontal plane, and all hinges of the assembly are provided with elastic liners.

2. Description of the Prior Art

An axle and suspension assembly of that kind has been disclosed in Published German Application No. 2,319,943. In that known assembly the wheel carriers are linked to the rear side of the crosspiece by means of rigid lower wishbones, which extend outwardly and downwardly from the crosspiece, and the wheel carriers are connected to the body or another rigid structure of the vehicle by means of spring elements constraining the wheel carriers to move in a generally vertical direction. Under the action of the lateral forces exerted when the vehicle is cornering the crosspiece can assume an oblique position so that a toe-in or toe-out action will be exerted on the wheels and a certain self-steering action will be obtained. But that oblique position of the crosspiece will depend only on the instantaneous characteristics of the two mounting bodies, and said characteristics will be determined by the different stiffnesses of said mounting bodies in different directions. For this reasons the mounting bodies must not be too soft because this would impair the riding comfort. The fact that the self-steering action depends only on the elastic mounting bodies has also the disadvantage that the crosspiece will also assume an oblique position and a toe-in or toe-out action will also be obtained when different frictional forces act between the road and the two wheels carried by the axle or in the case of a sudden change from braking to acceleration or vice versa although in such cases an oblique positioning of the crosspiece will be undesirable and will adversely affect the safety of the traveling vehicle. If the mounting bodies are too soft, the inertial forces of the entire axle and suspension assembly cannot perfectly be controlled in case of sudden steering actions of the driver and the self-steering action of the axle and of the unsteerable wheels will be undesirably delayed.

It is also known to link each wheel carrier to the crosspiece by two lower transverse control arms and to connect each wheel carrier to the body or another rigid structure of the vehicle, by means of a longitudinal control arm and a spring strut in an arrangement in which the longitudinal axes of the lower transverse control arms intersect at a point which is disposed on the outside of the adjacent wheel and axially spaced therefrom. Such an arrangement has been dislcosed by Jörnsen Reimpell in Fahrwerktechnik 1, VOGEL-Verlag, 5th edition 1982, page 402). But in that known arrangement the crosspiece is rigidly secured to the body or another rigid structure of the vehicle so that only a small toe-in or toe-out effect can be achieved because such effect is allowed for only by the relatively small volume of elastic material which consists of the elastic liners of the hinges. If larger volumes or a softer elastic material were used for such liners, the directional control of the wheels will be adversely affected, particularly because all braking and accelerating forces must be transmitted to the body or other rigid structure of the vehicle by means of the elastic liners.

Published German Application No. 1,911,795 discloses a rigid axle, which by a centrally disposed, elastic mounting body is secured to the body or another rigid structure of the vehicle and is also connected to said body or rigid structure by two diagonal struts. In that known arrangement, the axes of the diagonal struts intersect at a point which is disposed on the vertical longitudinal center plane of the vehicle at the rear of the rigid axle. That design has the disadvantage that the toe-in or toe-out effect is restricted by the limitation of the pivotal movement of the rigid axle and the self-steering behavior cannot be influenced in another way. The range of movement is limited by the centrally disposed, elastic mounting body so that the range in which the material and design of the mounting body can be selected to improve the riding comfort will also be restricted. An excessively soft elastic material will also involve the disadvantages which have been stated hereinbefore in connection with the arrangement comprising a crosspiece and rigid lower wishbones. Similar remarks are applicable to another known wheel suspension, which is known from Published German Application No. 2,818,198 and in which the lower transverse control arms are directly pivoted to the body or another rigid structure of the vehicle and a diagonal control arm provided with elastic hinges is associated with each wheel carrier.

SUMMARY OF THE INVENTION

It is an object of the invention to eliminate all disadvantages discussed hereinbefore and so to improve the axle and suspension assembly which is of the kind described first hereinbefore that a self-steering action will be obtained only in response to lateral forces and that a larger latitude is provided regarding the design of the mounting bodies.

That object is accomplished in accordance with the invention in that the crosspiece is connected to the body or another rigid structure of the vehicle in known manner by means of two diagonal struts, the longitudinal axes of which intersect at a point which is disposed at the rear of the axle and suspension assembly, each wheel carrier is linked to the crosspiece by two lower transverse control arms, which extend at an acute angle to each other and have longitudinal axes which intersect at a point which is disposed outside the adjacent wheel and is axially spaced therefrom, and each wheel carrier is connected to the body or other rigid structure of the vehicle by a longitudinal control arm, which is hinged to said rigid structure.

The diagonal struts define the instantaneous center for the pivotal movement of the crosspiece and ensures that the latter will be exactly guided so that the latitude of the design of the elastic mounting bodies and the selection of their spring characteristic is greatly increased. Because each wheel carrier is linked to the crosspiece by two lower transverse control arms rather than by rigid wishbones, the wheel can be angularly moved beyond the limits of the toe-in and toe-out movements which are due to the oblique positoin of the crosspiece and braking and/or accelerating forces need not be allowed for because they will be taken up or transmitted by the longitudinal control arms. As the inertial forces can be transmitted from the axle and suspension assembly to the body or other rigid structure of the vehicle by means of the diagonal struts and by the longitudinal control arms, such inertial forces can readily be controlled and the self-steering action will not undesirably be delayed in case of sudden steering actions of the driver. In accordance with the invention the crosspiece is connected to the body or other rigid structure of the vehicle by the diagonal struts and the wheel carriers are connected to said rigid structure by the longitudinal control arms. That arrangement affords the advantage that the self-steering action will be achieved only when it is necessary because corresponding lateral forces are exerted whereas no self-steering action will not be obtained in response to longitudinal forces which are due to braking or acceleration. It will be understood that the crosspiece might consist of a frame.

In an embodiment of the invention as applied to a driven axle the longitudinal axes of the diagonal struts intersect at a point which is laterally offset from the vertical longitudinal center plane of the vehicle and the hinges by which the diagonal struts are connected to the crosspiece are vertically spaced from the mounting bodies. The resulting moment which is due to the input torque of the differential associated with the axle and the output torque of that differential has a vector which is oblique to the direction of travel and in the mounting bodies gives rise to reaction forces which tend to move the crosspiece to an oblique position. A steering action which would be due to said resulting moment is undesired and will be compensated because the longitudinal axes of the diagonal struts intersect at a point which is laterally offset from the longitudinal center line of the vehicle. The action of the driving torque on the housing of the differential associated with the axle is taken up because the hinges connecting the diagonal struts to the crosspiece are vertically spaced from the mounting bodies.

DETAILED DESCRIPTION OF THE PREFERRED EMBODIMENTS

Figure 1:
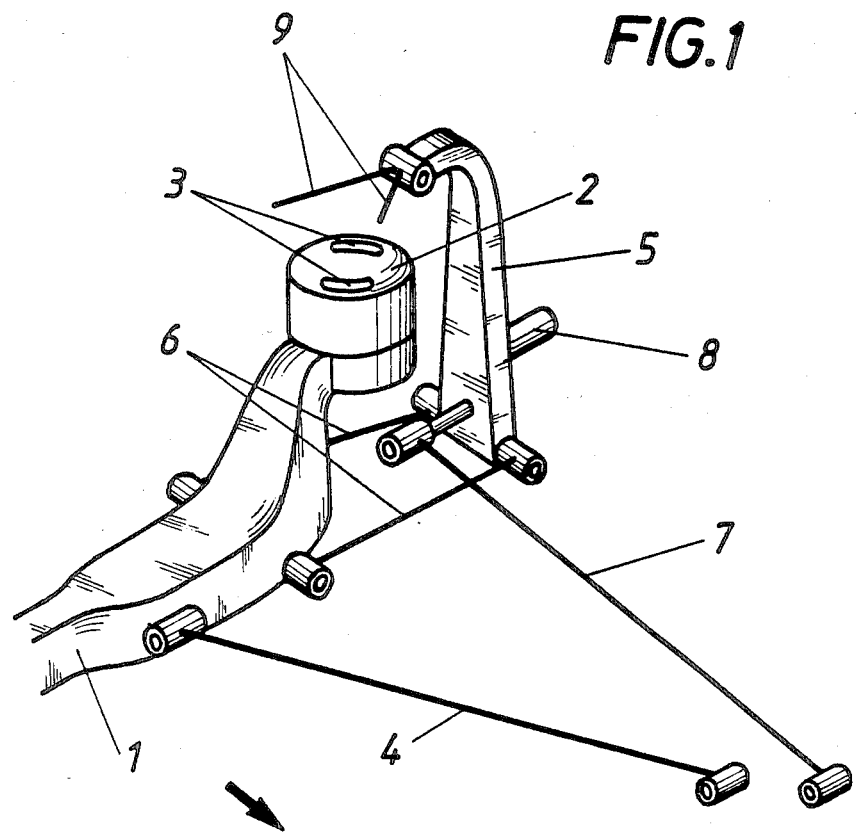
FIG. 1 is a diagrammatic perspective view showing the left-hand half of an axle and suspension assembly of a motor vehicle.

Two illustrative embodiments of the invention are shown on the drawing.

Figure 2:
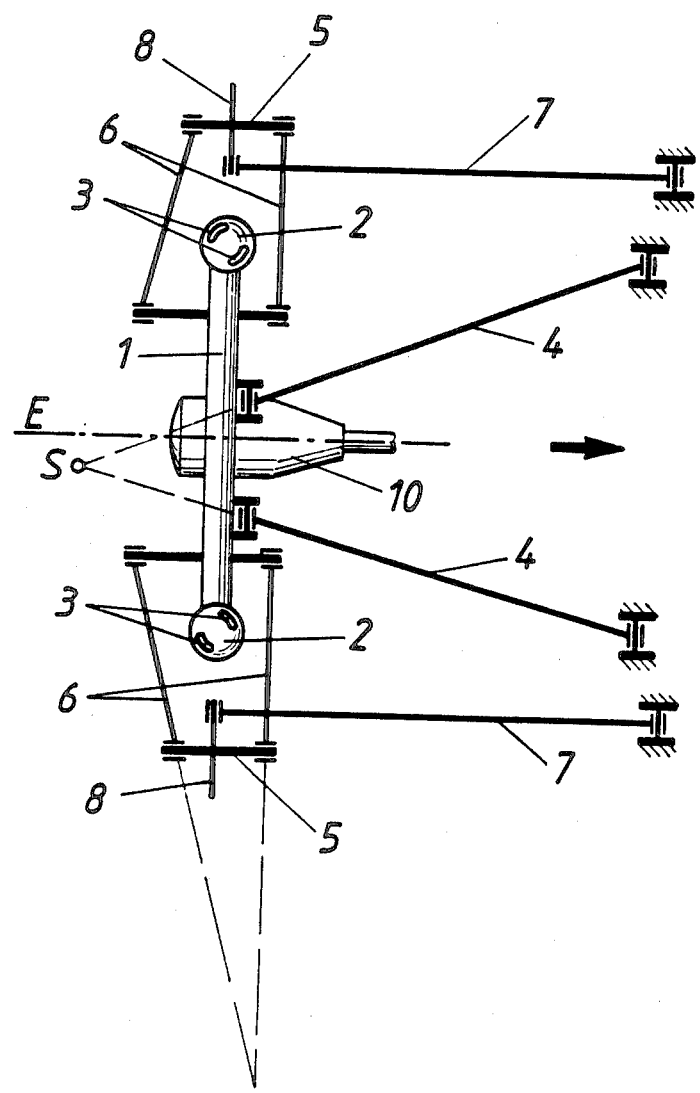
FIG. 2 is a top plan view showing such an assembly comprising a driven axle.

An axle and suspension assembly for mounting two unsteerable wheels of a motor vehicle comprises a crosspiece 1, which is secured by resilient mounting bodies 2 to a body of the vehicle. That body is not shown and constitutes a rigid structure of the vehicle. For the purposes of the invention a wheel is described as unsteerable if it cannot be arbitrarily steered but can be used for a self-steering action. Each mounting body 2 has approximately cardioid apertures 3 so that the mounting body 2 has different stiffnesses in generally horizontal plane in two directions which include oblique angles with the direction of travel, which is indicated by an arrow. The crosspiece 1 is connected to the body or other rigid structure of the vehicle by two diagonal struts 4, the longitudinal axes of which intersect at a point S, which is disposed at the rear of the axle and suspension assembly (see FIG. 2). That assembly also comprises two wheel carriers 5, each of which is linked to the crosspiece 1 by means of two lower transverse control arms 6. Each wheel carrier 5 is also connected to the body or other rigid structure of the vehicle by a longitudinal control arm 7. The longitudinal axes of the two lower transverse control arms 6 associated with each wheel carrier 5 include an acute angle with each other and intersect at a point which is disposed outside of and axially spaced from the adjacent wheel (see FIG. 2), which is represented only by a stub axle 8. For an approximately vertical guidance of the wheel carrier 5, an upper transverse control arm 9 (FIG. 1) or a spring strut may be provided. FIG. 2 shows a differential 10 and it is apparent that the longitudinal axes of the diagonal struts 4 intersect at a point S which is laterally offset from the vertical longitudinal center plane E of the vehicle. In that case the hinges connecting the diagonal struts 4 to the crosspiece 1 to the differential housing 10, respectively, are vertically spaced from the mounting bodies 2.

In both embodiments, all hinges are provided with elastic liners.

I claim:

1. An axle and suspension assembly for mounting two unsteerable wheels of a motor vehicle having a rigid structure, comprising a crosspiece;

two resilient mounting bodies, which are spaced apart along said crosspiece and secured to the latter and adapted to be secured to said rigid structure, said mounting bodies providing a resilient connection between said crosspiece and said rigid structure, each of said mounting bodies having different stiffnesses in different directions in a generally horizontal plane;

two wheel carriers, each of which carries one of said wheels;

linking means linking said wheel carriers to said crosspiece at opposite ends thereof and permitting each of said wheel carriers to perform a vertical movement relative to said crosspiece;

constraining means connected to said wheel carriers and adapted to be connected to said rigid structure so as to constrain said wheel carriers to move in a generally vertical direction relative to said crosspiece and said rigid structure;

hinge means provided with elastic liners and hingedly interconnecting parts of said assembly to each other and adapted to hingedly connect said assembly to said rigid structure;

two diagonal struts hingedly connected by said hinge means to said crosspiece and adapted to be hingedly connected by said hinge means to said rigid structure so that the longitudinal axes of said diagonal struts intersect to the rear of said assembly, said linking means associated with each of said wheel carriers comprising two lower transverse control arms, which have longitudinal axes intersecting at a point that is disposed on the outside of and axially spaced from the adjacent one of said wheels, and a longitudinal control arm hingedly connected by said hinge means to each of said wheel carriers and adapted to be connected by said hinge means to said rigid structure.

2. The apparatus set forth in claim 1 as applied to a motor vehicle in which said rigid structure consists of a vehicle body.

3. The apparatus set forth in claim 1 as applied to a vehicle having a vertical longitudinal center plane, wherein
the longitudinal axes of said diagonal struts intersect at a point which is offset from said longitudinal vertical center plane and
said diagonal struts are hingedly connected to said crosspiece by said hinge means at points which are vertically spaced from said mounting bodies.

4. The apparatus set forth in claim 3 as applied to an assembly in which said unsteerable wheels are driven wheels and a differential operatively connected to said wheels to drive the same is carried by said crosspiece.

5. The apparatus of claim 1, wherein each of said mounting bodies includes an aperture, said apertures providing said mounting bodies with different stiffnesses in a generally horizontal plane.

6. The apparatus of claim 5, wherein said aperture is cardioid in shape.

7. The apparatus of claim 1, wherein said constraining means comprises at least one upper transverse control arm spaced vertically from said lower transverse control arms.

8. The apparatus of claim 7 wherein said constraining means comprises a pair of upper transverse control arms.

9. The apparatus of claim 1, wherein said constraining means comprises a spring strut.

10. A motor vehicle comprising a rigid structure, two unsteerable wheels, and an axle and suspension assembly for mounting said two unsteerable wheels on said rigid structure, comprising
a crosspiece;
two resilient mounting bodies, which are spaced apart along said crosspiece and secured to the latter and to said rigid structure, said mounting bodies providing a resilient connection between said crosspiece and said rigid structure, each of said mounting bodies having different stiffnesses in different directions in a generally horizontal plane;
two wheel carriers, each of which carries one of said wheels;
linking means linking said wheel carriers to said crosspiece at opposite ends thereof and permitting each of said wheel carriers to perform a vertical movement relative to said crosspiece;
constraining means connected to said wheel carriers and to said rigid structure so as to constrain said wheel carriers to move in a generally vertical direction relative to said crosspiece and said rigid structure;
hinge means provided with elastic liners and hingedly interconnecting parts of said assembly to each other and to said rigid structure;
two diagonal struts hingedly connected by said hinge means to said crosspiece and to said rigid structure so that the longitudinal axes of said diagonal struts intersect to the rear of said assembly,
said linking means associated with each of said wheel carriers comprising two lower transverse control arms, which have longitudinal axes intersecting at a point that is disposed on the outside of and axially spaced from the adjacent one of said wheels, and
a longitudinal control arm hingedly connected by said hinge means to each of said wheel carriers and to said rigid structure.

11. The apparatus set forth in claim 10 as applied to a vehicle having a vertical longitudinal center plane, wherein
the longitudinal axes of said diagonal struts intersect at a point which is offset from said longitudinal vertical center plane and
said diagonal struts are hingedly connected to said crosspiece by said hinge means at points which are vertically spaced from said mounting bodies.

12. The apparatus of claim 10, wherein said constraining means comprises at least one upper transverse control arm spaced vertically from said lower transverse control arms.

13. The apparatus of claim 12, wherein said constraining means comprises a pair of upper transverse conrol arms.

14. The apparatus of claim 10, wherein said constraining means comprises a spring strut.

* * * * *